Nov. 10, 1964  S. DUBIN  3,156,181
TYPE WHEEL PRINTER
Filed Aug. 3, 1961  3 Sheets-Sheet 1
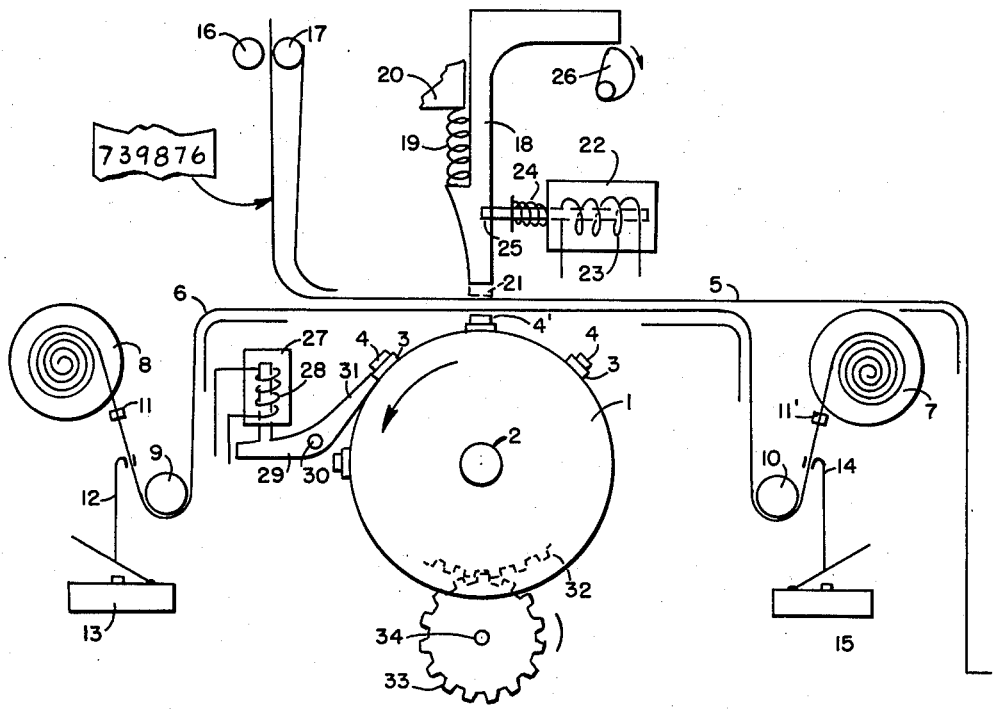
FIG. 1
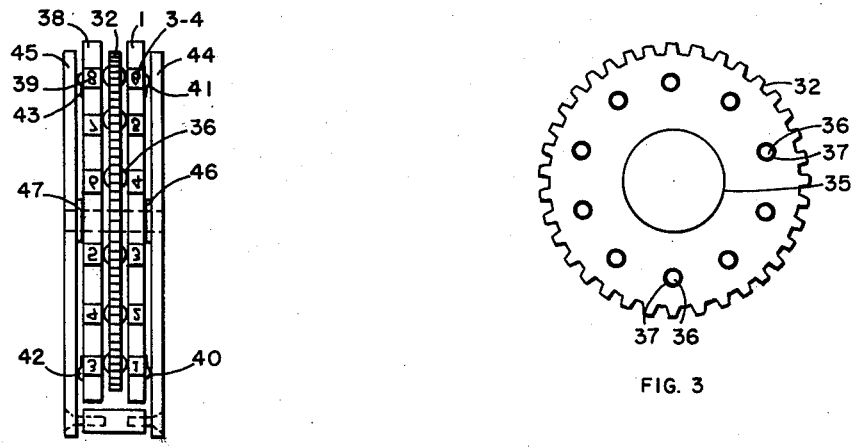
FIG. 2
FIG. 3
INVENTOR.
SOL DUBIN
BY Alfred W. Barber
ATTORNEY Nov. 10, 1964     S. DUBIN     3,156,181
TYPE WHEEL PRINTER Filed Aug. 3, 1961     3 Sheets-Sheet 2

INVENTOR.
SOL DUBIN
BY *Alfred W. Barber*
ATTORNEY 3,156,181
TYPE WHEEL PRINTER
Sol Dubin, Massapequa, N.Y., assignor to Telechrome Manufacturing Corp., Amityville, N.Y., a corporation of New York.
Filed Aug. 3, 1961, Ser. No. 129,132
1 Claim. (Cl. 101—110)

The present invention concerns printers and in particular, printers utilizing multiple type wheels and the like.

There are many applications in electrical instrumentation systems for printers which under control of electrical signals provide printed records. For example, in a machine for automatically weighing and measuring metal pipe, it is a requirement that the results and other pertinent data be printed out for a permanent record. Such printing systems will be called upon to print say once every few seconds up to say once a second. Such printing rates may be termed medium speed printers. These printers are required to operate in response to electrical signals and to print on paper sheets or other suitable media.

The present invention concerns a medium speed printer of novel design and having many advantages over printers in this field hitherto available. A plurality of individual printing wheels are utilized mounted in pairs and which may be assembled in line to provide any desired number of characters along a line. A pair of type or printing wheels is mounted in a simple, sturdy, long life assembly which is readily removed and replaced. The two printing wheels are turned by a single driving wheel in a mutually cooperating relationship. By providing the wheels in pairs an advantageous balance between simplicity, minimum number of parts and cost of replacement of a single wheel is obtained. In addition to the novel print wheel arrangement certain other novel components are provided including a simple and practically fool-proof printing ribbon feeding device.

Accordingly the main object of the present invention is to provide methods of and means for printing out information from electrical signals which are rugged, effective, long life and being simple to maintain.

Another object is to provide easily interchanged printing wheels in pairs.

Still another object is to provide a simple and effective printing ribbon feed system.

A further object is to provide a compact printing wheel assembly.

These and other objects will be apparent from the detailed description of the invention given in connection with the various figures of the drawing.

In the drawing:

FIGURE 1 is a diagrammatic representation of the essential components of a printer in accordance with the present invention.

FIGURE 2 is a more detailed view of a typical print wheel assembly.

FIGURE 3 is a view of details of the print wheel driving gear.

Figure 4:
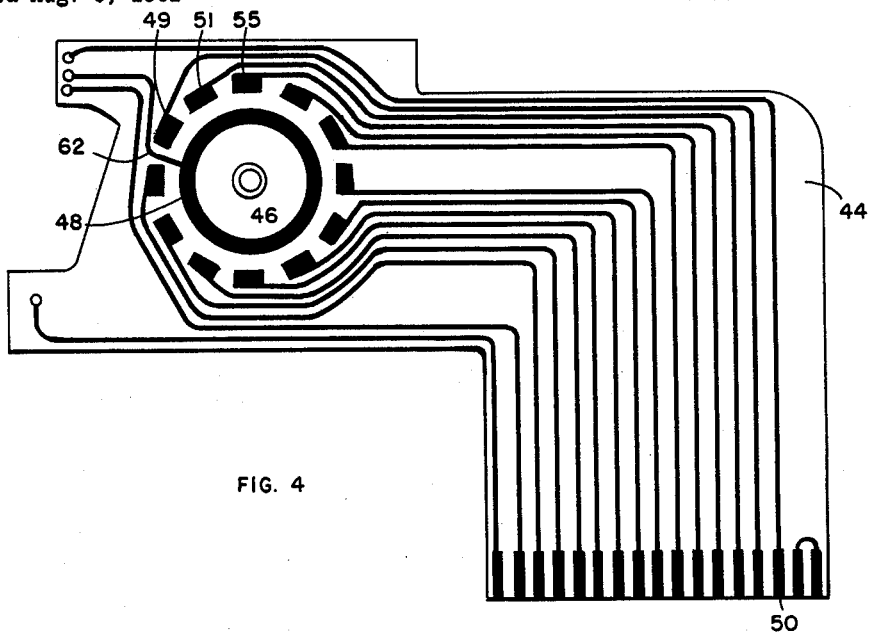
FIGURE 4 is a plan view of the commutator used in the print wheel assembly.

FIG. 1 shows an end view of a typical print wheel 1 turning on shaft 2 with the commutator removed for a clearer understanding of the mode of operation of the printer. (The commutator is shown in FIGS. 2 and 4.) Carried on the periphery of type wheel 1 are a plurality of projections 3 mounting raised characters 4. The number of these mounted raised characters is determined by the number of different characters and signs to be printed by the system. Printing is to be carried out on a suitable printing sheet such as paper web 5 by means of an inking medium such as inked ribbon 6. The printing sheet is moved across the printing area between hammer 18 and type wheel 1 by suitable means such as drive rollers 16–17. Ribbon 6 is stepped across the printing area by suitable means such as stepping motors (FIG. 8) driving one of ribbon spools 7–8 and holding the other back to maintain a tension on the ribbon. The ribbon feeds over guide rollers 9 and 10. Ribbon reversal switches 13 and 15 are provided with end-of-ribbon detection arms 12 and 14 so that reversal of the direction of ribbon feed is provided automatically when the end-of-ribbon indicator 11 or 11' actuates one of the switches. Printing is accomplished when hammer 18 is released upon energizing coil 23 of solenoid 22 withdrawing pin 25 against return spring 24 so that hammer 18 is driven toward the printing point by spring 19 bearing against frame 20. The hammer is released by actuating solenoid 22, as will be described below, and the actual release of the hammer takes place when cam 26 is rotated beyond the end of the hammer. When this takes place, hammer 18 is impelled toward the type face under the paper and ribbon by spring 19 which pushes the hammer head to the position shown at 21. At this point the momentum of the hammer carries it into printing contact with a character 4 through the paper and ribbon impressing the character on the paper and returning to position 21. As cam 26 continues to rotate under control of suitable drive means, not shown, it draws the hammer back to its original position and is locked by the release of pin 25. Before the hammer is actuated the print wheel 1 must be stopped at the desired character. This is accomplished by means of solenoid 27, since print wheel 1 is normally maintained continually rotating as will be explained below. Upon command coil 28 is energized pivoting arm 29 around pivot 30 and stopping wheel 1 by contact of arm end 31 with raised portion 3 and bringing a desired printing character 4' under the printing hammer. The hammer operational sequence follows resulting in a printed character. Print wheel 1 is provided with continuous rotational torque from gear 33 on shaft 34 rotated by suitable means, not shown, through gear 32 as will be explained more fully below.

FIG. 2 shows details of a typical assembly of two printer wheels 1 and 38 carrying printing characters 4 and 39. These two printing wheels are assembled with a drive gear 32 between transmitting rotational torque by means of a plurality of balls 36. As gear 32 is rotated, as shown in FIG. 1, balls 36 roll between wheels 1 and 38 under pressure supplied by the assembly and transmit driving torque which is smooth and constant over a long operational life due to the large areas involved and the relatively low pressure required. The two printing wheels and single drive gear are assembled between two end plates 44 and 45 over a central hub having spacer bearings 46 and 47 and held together in definite spaced relation at these points. End plates 44 and 45 also carry commutators fashioned by printed circuit methods (see FIG. 4) and contacted by wipers 40–41 and 42–43 carried by printing wheels 1 and 38 respectively and shown in detail in FIG. 5.

FIG. 3 shows gear wheel 32 having a large central clearance hole designed to ride on flanges of printing wheels 1 and 38, not shown and the openings 37 for receiving and retaining in freely rotating fashion the drive balls 36. Gear 32 is rotated by a gear meshing with the teeth on its periphery as shown in FIG. 1.

FIG. 4 shows the inside of a typical end plate and commutator 44 which carries hub 46 and printed common commutator ring 48 and individual segments 49, 51, etc. The common circuit is brought out at 62 and the individual segments in a row along the edge at 50.

Figure 5:
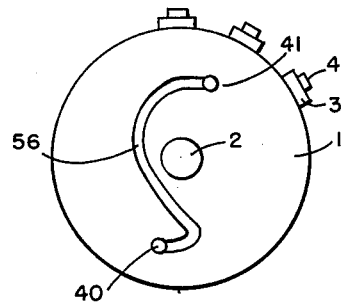
FIGURE 5 is a detail of the print wheel brush arrangement.

FIG. 5 shows a typical printing wheel 1 with the two connected brushes or wiping contacts 40 and 41. These brushes serve to make contact between segments such as 49 of the commutator and the common ring 48 so that circuits are sequentially closed between the circuits at 50 and common circuit 62. Each time a circuit is thus closed, it indicates that a particular printing character is nearing the printing position.

Figure 6:
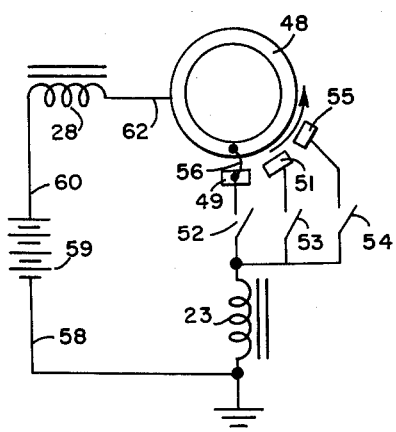
FIGURE 6 is a schematic of the printing control circuits.

FIG. 6 is a schematic of the control circuit including the commutator of FIG. 4 and the brushes of FIG. 5 as well as the solenoids to be controlled of FIG. 1. FIG. 6 shows solenoid coil 28 controlling the point at which the printing wheel is to be stopped and solenoid coil 23 for releasing the printing hammer connected in series with a suitable source of power such as battery 59 over leads 58, 60 and 62 and with common ring 48, an individual commutator contact 49, brush circuit 56 and a control switch 52. Other typical control switches 53, 54 are shown connected to commutator segments 51 and 55. Thus if switch 52 has been closed by automatic or manual means, not shown, calling for printing a certain character, when brush 56 comes to segment 49, solenoid coil 28 will operate the print wheel stopping solenoid 27 (FIG. 1) and solenoid coil 23 will operate hammer priming solenoid 22 (FIG. 1) and the chosen character will be printed as described above. Thus the operational cycle consists in starting with cam 26 up and hammer 18 withdrawn and held by pin 25; the print wheels are freely rotating under drive torque furnished by the balls in the drive gear 32 and the brushes are scanning the commutator segments; cam 26 comes to the release point only when time enough has been allowed for the print wheels and scanning brushes to make a complete sweep of all segments and the desired circuit has been found; the print wheel is stopped at the desired character and the hammer primed; cam 26 passes beyond the holding point and the character is printed; after which cam 26 draws up hammer 18; pin 25 reseats and the cycle is ready to start over again.

In a printer of the type being described a large quantity of printing must be accomplished with a minimum of down-time or maintenance. The printing ribbon, therefore, must be programmed automatically and with minimum possibility of failure to reverse, etc. According to the present invention it has been found that the ribbon may be programmed to meet these conditions with a pair of stepping motors one of which pulls the ribbon in increments and the other holds it back to keep it smooth and under tension. For example, a switch may be closed automatically at each printing operation to step the ribbon pulling motor. The hold back motor if of the permanent magnet stepping type automatically exerts hold back tension. The functions of the two motors is completely reversible so that only two motors are required by the system. Suitable motors for the purpose are sold under the trademark name Slo-Syn by Superior Electric Co.

Figure 7:
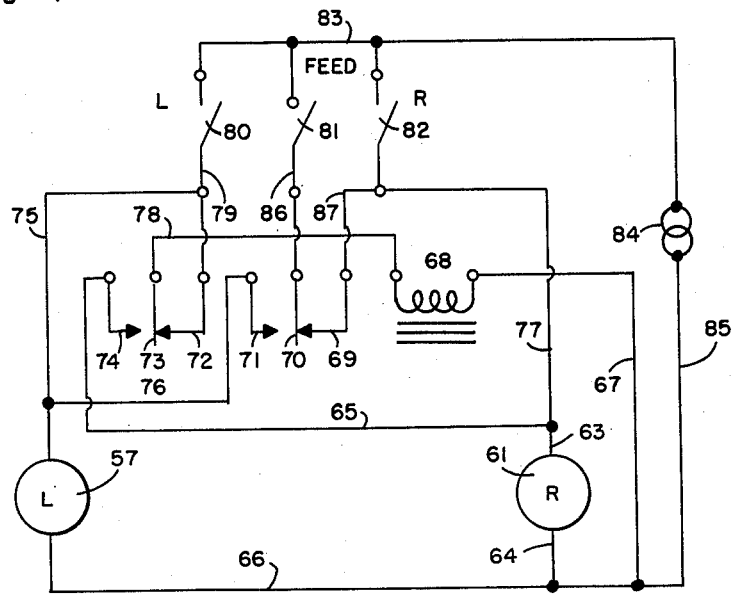
FIGURE 7 is a schematic of the ribbon control circuit.
Figure 8:
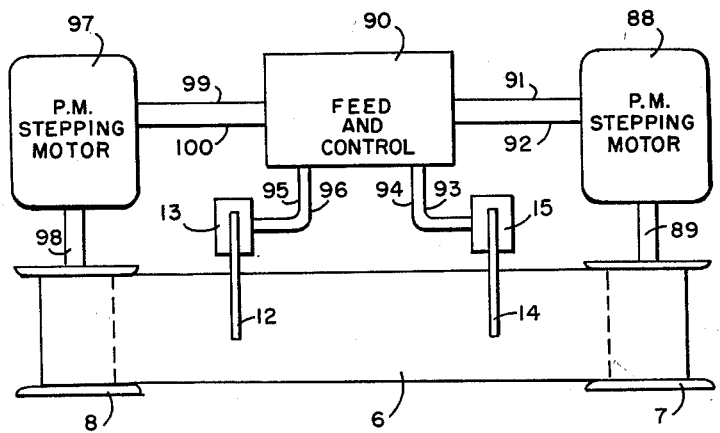
FIGURE 8 is a diagrammatic representation of the ribbon feed and control system.

A plan view of the ribbon feed system is shown in FIG. 8 and the actual schematic circuit diagram is shown in FIG. 7. The same parts are shown in the two figures although different designating numerals have been applied. In FIG. 7 the ribbon feed motors are marked R and L and designated 61 and 57 respectively. A source of power 84 is connected over leads 85 and 64 to a common side of motors 61 and 57. A latching relay including coil 68 and contacts 69 through 74 is provided and utilized for reversing the ribbon as will be described below. Lead 83 connects power source 84 to one side of switches 80, 81 and 82. With the relay contacts closed as shown i.e. 69 to 70 and 72 to 73, if feed switch 81 is closed momentarily, a power circuit is completed over leads 86, 87, 77 and 63 to motor 61 causing it to step (and draw the ribbon). This feed switch 81 may be made to close as often as is required to present suitable ribbon surface to the printing area. When motor 61 has stepped the ribbon until it nears its end point, an end-of-ribbon device (11 in FIG. 1) closes switch 80, energizing relay coil 68 and transferring the relay contacts to their second holding position with contacts 73–74 and 70–71 closed. Closing switch 80 at the same time energizes motor 57 over lead 75 causing it to step and draw the ribbon in the reverse direction. This reverse drive continues as long as switch 80 is closed and until at least the end-of-ribbon device moves out of contact with it. Now, when switch 81 is reclosed for normal ribbon feed, a circuit is closed through contacts 70–71 and over leads 86 and 76 to step motor 57 and move the ribbon in its second direction. This process continues until the end-of-ribbon device at the other end of the ribbon closes switch 82, and again energizes relay coil 68 over leads 77, 65, 78 and 67 and through contacts 73–74 to return the latching relay to its first position and start the ribbon feeding sequence over again.

FIG. 8 shows a plan diagrammatic representation of the two ribbon stepping motors 88 and 97 turning ribbon spools 7 and 8 over shafts 89 and 98 respectively. Ribbon 6 is shown passing between spools 7 and 8 and through end-of-ribbon detection arms 12 and 14 for actuating micro-switches 13 and 15 respectively. The ribbon feed and control circuits are represented by box 90 connected to motor 97 over power supply leads 99–100, to motor 88 over power supply leads 91–92, to switch 13 over leads 95–96 and to switch 15 over leads 93–94. The actual operation of the system has been explained in detail above in connection with FIG. 7 wherein motor 88 is shown as motor 61, motor 97 is shown as motor 57, switch 15 is shown as switch 82 and switch 13 is shown as switch 80. If power source 84 is alternating current as shown symbolically the motors run like synchronous motors as long as their power supply circuits are closed moving one pole angle for each cycle of the alternating current.

While only one embodiment of the present invention has been shown and described, many modifications will be apparent to those skilled in the art within the spirit and scope of the invention as set forth in particular in the appended claim.

What is claimed is:

In a type wheel device for a type wheel printer, the combination of, a print wheel assembly including a pair of end supports in predetermined spaced relationship, two type wheels carried between said supports, a disc-like gear containing a plurality of spherical balls mounted under pressure between said wheels to thereby transmit driving torque to the type wheels on each side of said disc-like gear when said gear is engaged with a rotating mating gear and turning said wheels by contact substantially solely through the medium of said balls.

References Cited in the file of this patent
UNITED STATES PATENTS

| | | |
|---|---|---|
| 1,075,142 | Deming | Oct. 7, 1913 |
| 1,421,525 | Meisel | July 4, 1922 |
| 1,446,069 | Root | Feb. 20, 1923 |
| 1,811,133 | Kleinschmidt | June 23, 1931 |
| 1,909,550 | Pierce | May 16, 1933 |
| 2,157,035 | Torkelson | May 2, 1939 |
| 2,297,744 | Carroll | Oct. 6, 1942 |
| 2,720,832 | Luning | Oct. 18, 1955 |
| 2,724,332 | Schlessiger | Nov. 22, 1955 |
| 2,796,830 | Hilton | June 25, 1957 |
| 2,831,424 | MacDonald | Apr. 22, 1958 |